(12) United States Patent
Drinkwater et al.

(10) Patent No.: US 6,265,039 B1
(45) Date of Patent: Jul. 24, 2001

(54) ABRASION PROTECTION

(76) Inventors: Ian Clive Drinkwater, 40 The Willows, Highworth, Wiltshire SN6 7PG; Alan George Ryder, 19 Hadrian's Close, Stratton St. Margaret, Swindon, Wiltshire SN3 4BE; Frank James Lowe, 20 Thurey Drive, Grange Park, Swindon, Wiltshire SN5 6EP, all of (GB)

( * ) Notice: Subject to any disclaimer, the term of this patent is extended or adjusted under 35 U.S.C. 154(b) by 0 days.

(21) Appl. No.: 09/202,635

(22) PCT Filed: Jun. 6, 1997

(86) PCT No.: PCT/GB97/01544

§ 371 Date: Dec. 18, 1998

§ 102(e) Date: Dec. 18, 1998

(87) PCT Pub. No.: WO97/48940

PCT Pub. Date: Dec. 24, 1997

(30) Foreign Application Priority Data

Jun. 18, 1996 (GB) .................................................. 9612667
May 21, 1997 (GB) .................................................. 9710352

(51) Int. Cl.$^7$ .................................................. B29D 22/00
(52) U.S. Cl. .................................................. 428/36.1
(58) Field of Search .................................................. 428/36.1

(56) References Cited

U.S. PATENT DOCUMENTS

| 3,669,157 | 6/1972 | Woodall, Jr. et al. . |
| 4,836,080 | 6/1989 | Kite, III et al. . |
| 5,413,149 | 5/1995 | Ford et al. . |

FOREIGN PATENT DOCUMENTS

| 0243985 A2 | 4/1987 | (EP) | ............................... B29C/61/06 |
| 2 173 959 | 10/1986 | (GB) . | |
| WO 93/09372 | 5/1993 | (WO) | ............................... F16L/13/00 |
| WO 96/09483 A1 | 3/1996 | (WO) | ............................... F16J/15/02 |
| WO 96 37359 | 11/1996 | (WO) . | |

OTHER PUBLICATIONS

Search Report for International Application No. PCT/GB97/01544, Mailed Sep. 23, 1997.
Search Report for Great Britain Application No. GB 9612667.7, Mailed Sep. 12, 1996.
Search Report for Great Britain Application No. GB 9701378.3, Mailed Apr. 9, 1997.

Primary Examiner—Elizabeth M. Cole
Assistant Examiner—Christopher C. Pratt

(57) ABSTRACT

The use of a fabric sheath (2), or other article, on a conduit (1), for example a pipe or flexible hose, to provide abrasion resistance or other forms of protection, for example impact protection or cut-through protection, thereto; and fabric sheaths suitable for such use. A preferred form of circumferentially-heat-shrinkable sheath of woven fabric, capable of use on a conduit, for example to provide impact cushioning and/or abrasion resistance, provides a substantially unobscured outer fabric surface and comprises hoop filaments extending substantially circumferentially around the sheath, at least some of which hoop filaments are heat-shrinkable, and length filaments extending substantially along the sheath, wherein the length filaments are selected either (A) to be sufficiently flexible, at least at temperatures to which they are subjected during heat-shrinking of the sheath in use, for the heat shrinkage of the hoop filaments to crimp the length filaments to an extent (a) producing at least 1%, preferably at least 2%, more preferably at least 5%, longitudinal shrinkage of the sheath in addition to any longitudinal heat shrinkage thereof and/or (b) causing portions of the length filaments either (i) to project outwardly from the shrunken fabric sheath to a maximum distance in excess of the maximum projection distance of the thus-shrunken hoop filaments, or (ii) to increase such excess projection distance if already existing before the heat shrinkage;

or (B) to be sufficiently stiff to limit the longitudinal shrinkage due to crimping of the length filaments to less than 10%, preferably less than 5%, more preferably less than 2%, especially less than 1% or substantially zero.

24 Claims, 4 Drawing Sheets

ABRASION PROTECTION

The present invention relates to the use of a fabric sheath, or other article, on a conduit, for example a pipe or flexible hose, to provide abrasion resistance or other forms of protection, for example impact protection or cut-through protection, thereto, and relates to fabric sheaths suitable for such use. One aspect of the invention relates to circumferentially-heat-shrinkable sheaths of woven fabric for use in providing abrasion protection to conduits. The conduits may be fluid or electrical conduits, or other elongate guiding forms, such as electrical wiring bundles or harnesses, or electrical or optical cables.

Mechanical protection of hoses etc. is often found to be necessary because it is difficult to provide all of the desired properties in a single material. For example, a hose must in general be impermeable to fluids, flexible and heat-resistant. The preferred materials for providing those properties often have poor abrasion and cut-through resistance.

U.S. Pat. No. 5,413,149 (Bentley Harris) discloses a flexible, kink-resistant shaped fabric product for protecting and/or covering cables, conduits and wiring etc. The shaped fabric has a wall portion comprising a filament resiliently set in a spiral configuration with respect to the longitudinal axis of the shaped product. The wall portion may also comprise a filament in the form of circumferential hoops substantially conforming in shape and size to the cross-sectional configuration of the shaped product. To achieve the resilient set, thermoplastic filaments are heated to a temperature above their glass transition point and are then cooled to cause recrystalization or "set" of the filaments. The resulting product then has the desired spiral resilient bias. This is stated to be an "elastic memory". Whilst the products disclosed in U.S. Pat. No. 5,413,149 are satisfactory for many purposes, we have found that it may be difficult to locate the products on the conduit to be protected. In general some fixing means such as a small length of heat-shrinkable tubing will be required at each end of the product.

A further prior art product, known as "Expando", is also disclosed in U.S. Pat. No. 5,413,149. This product is an open braid that when compressed longitudinally expands radially, and vice versa. It is therefore longitudinally compressed, pushed over a hose to be protected, and then longitudinally stretched. The ends must, however, be secured in position by some additional means.

I have now discovered an alternative approach to abrasion resistance which makes use of heat-shrinkage of a fabric product, and one aspect of the present invention accordingly provides the use of a heat-shrinkable fabric sheath to provide abrasion resistance or impact resistance or cut-through resistance to a conduit, for example a pipe or flexible hose.

It should be noted that, although "heat-shrinkage" makes use of the property of "elastic memory", the resilient set disclosed in U.S. Pat. No. 5,413,149 does not result in a heat-shrinkable sheath. In fact, since it is a spiral configuration that is locked in by the process of setting, the effect of heat on the prior art product would, if anything, result in its radial expansion. In this respect, and in others, the prior art clearly teaches away from the present invention.

Various fabric designs may be employed in the present invention, but I prefer to use a weave, in particular a plain weave, although other weaves such as a 2/2 twill would be suitable. When using a weave, I prefer that one set of fibres runs substantially parallel to the length of the sheath, and another set of fibres runs substantially circumferentially of the sheath. If the sheath is to be made continuously in line, it will be desirable (at least when using a narrow fabric loom) for the warp fibres to become the longitudinal fibres of the sheath, and the weft fibres to become the circumferential fibres of the sheath.

By using a fabric for abrasion resistance, it is possible to select as circumferential fibres those that are ideal for the provision of heat-shrink properties, and to select for the longitudinal fibres those which are ideal for provision of abrasion-resistance, for example toughness, resistance to notch propagation, low coefficient of friction, impact resistance, and high temperature performance. Such fibres preferably predominate on an external surface of the sheath. Thus, I prefer to use high density polyethylene (HDPE) as the circumferential fibres and to use a polyester, such as polyethylene terephthalate, or a nylon in the warp direction. Other suitable circumferential fibres include polyolefins such as low density polyethylene, medium density polyethylene, polypropylene/polyethylene copolymers and fluoropolymers such as polyvinylidene difluoride (PVDF) and ethylene chlorotrifluoroethylene (E-CTFE). Other suitable longitudinal fibres include polyacryonitrile and copolymers thereof, polyphenylene sulphide, cellulose acetate, aromatic polyamides, eg Kevlar, natural fibres and fluoro polymers. The longitudinal abrasion-resistant fibres are preferably able to flatten-out and/or to move under the influence of an adjacent surface. This ability to flatten-out or to move results in that surface causing less damage to the fibres. To this end I prefer that the longitudinal fibres comprise multifilament bundles since the filaments within each bundle will be able to move slightly with respect to one another. At present I prefer to use a co-mingled yarn. A further advantage of multifilament bundles is that cut-through of any filament results in less overall damage to the product. The circumferential, heat-shrinkable, fibres may comprise simple monofilaments.

Various preferred characteristics of the product can be achieved by suitable selection of the weave density, weave design, and weaving process. For example, in order to protect the underlying hose against abrasion or cut-through by sharp objects, I prefer that a high-density weave, or weave using fibres of high tex value, be used to achieve a high optical coverage. Optical coverage is a well-known term that simply relates the percentage of a plan view of a fabric that is taken up by the fibres themselves, rather than by the interstices between then. The optical coverage, at least after shrinkage is preferably at least 75%, more preferably at least 95%, most preferably substantially 100%.

A second preferred characteristic of a fabric is that it be ribbed, preferably warp ribbed. This means that the fabric will have a surface relief comprising a series of parallel ribs. If the hose is to be protected from abrasion caused by an adjacent surface moving longitudinally with respect to the hose, it will generally be preferable for ribs to be provided that run circumferentially of the hose. Ribbed fabrics are well understood in the weaving art, and warp ribbed fabrics may be constructed by inserting several weft picks in succession into the same shed of an ordinary plain weave. A warp ribbed fabric will in general be woven with a larger number of ends than picks. The weft yarn generally has less twist than the warp yarn and is of heavier linear density, and if it is a single monofilament it will have zero twist.

Crimp is another characteristic of the fabric that may be considered. Preferably the crimp is predominantly in the longitudinal direction of the sheath.

Although it will depend on the tex value of the fibres, for most purposes the following weave densities will be suitable. 25–60, particularly 35–45 warp ends per cm, and 3–20, particularly 10–15 weft picks per cm. As mentioned above, the circumferential fibres are preferably monofilaments, and the longitudinal fibres preferably comprise multifilament bundles. More particularly, the longitudinal fibres comprise five to ten fold (particularly about seven fold) bundles, each of the fibres within each bundle again comprising a bundle of very fine filaments. Each of the folds is preferably 10–20 tex, (preferably about 17 tex (tex being the ISO standard for linear density of textile strands and is the weight in grams of 1000 m) and each of those filaments preferably comprises 30–40 very fine filaments. This results in longitudinal fibres of great flexibility and of great ability to flatten out and to move under the abrading effect of an adjacent surface. Damage to any one filament will not of course be catastrophic. The circumferential fibres preferably have a tex value of 5–200, more preferably 20–100, especially 30–60.

One advantage over the cited prior art was stated above to be that the sheath of the invention is easy to secure in place around the hose to be protected. The sheath may be produced in long lengths, cut to length, slid over the hose and then heat-shrunk around the hose to locate it in position. The desired shrinkage ratio for this purpose is from 1.2:1 to 5:1. The lower value will be suitable where the hose to be protected is straight and where installation at low tolerances is simple. Shrink ratios greater than, say, 5:1 might be difficult to achieve in practice and might result in instability or uneven shrinkage during installation. In general I prefer a shrink ratio between 1.5:1 and 4:1. Where the sheath is to be installed around a shaped, non-linear hose it may be desirable to provide some longitudinal shrinkage to avoid wrinkling at the bends in the hose. To this end I can include heat-shrinkable fibres in the longitudinal direction. A longitudinal shrinkage ratio of from 1–20%, more preferably 2–10%, will generally be suitable. Shrinkage when expressed as a ratio means a dimension before shrinkage compared to the dimension after shrinkage. When expressed as a percentage it means the change in a dimension, based on the dimension before change.

Where the sheath is produced in long lengths it will usually require cutting before installation. This can conveniently be done by a hot blade such as a hot knife, which not only cuts the fibres but welds them together at the new end of the sheath to prevent fraying. It is therefore desirable that the fibres be thermoplastic, and therefore not excessively cross-linked during their manufacture.

Some degree of cross-linking of at least some of the fibres of the sheath may be desirable to render the sheath heat-shrinkable. The circumferential fibres, which by virtue of their heat-shrinkability, drive shrinkage of the overall product, are preferably cross-linked and stretched before weaving of the fabric. They may be cross-linked and then stretched at an elevated temperature and then cooled, or the heating, stretching and cooling may precede the cross-linking. Generally it will be desirable to weave the fabric from heat-shrinkable fibres, although in some circumstances it may be preferred to produce the fabric from heat-stable fibres, and then stretch the fabric. Depending on the temperature performance of the product it may be desirable to cross-link the fibres which are, or are to become, heat-shrinkable before weaving in order that the longitudinal fibres may remain uncross-linked. In this way, the longitudinal fibres can readily be welded at their ends by the hot-knife cutting. Where higher temperature performance is required it may be desirable to cross-link the overall fabric (either by cross-linking separately all of the fibres from which it is to be made, or by cross-linking the woven fabric) in order to ensure that all of the fibres retain their integrity at high temperatures.

The sheath may be produced in the form of a tube, or other structure closed in cross-section or it may be woven as a sheet and later formed into a tube either before or during installation. A product formed into a tube during installation, known as a "wraparound sleeve" may be provided with a so-called closure mechanism to hold it in the wrapped around configuration around the hose.

If desired the sheath may be provided with some form of visual marking either for identifying it or as a means of determining when it has been subjected to abrasion. For example, a logo of distinguishing colour may be woven into the sheath using for example a Jaquard mechanism on a narrow fabric or other weaving machine. Such a logo may serve to identify the product as that of a particular company, it may be provided for aesthetic reasons, or it may be provided to indicate the nature of the fluid that the underlying hose is carrying. For example, hoses containing dangerous fluids or hoses that will become hot during use may be provided with a marking in red etc. by way of a warning.

Indication of abrasion may be provided as follows. Abrasion-susceptible fibres may be woven into the sheath such that they predominate on the external surface of the sheath that is likely to become abraded. If these abrasion-susceptible fibres are of a distinguishing colour with respect to the remainder of the sheath then the appearance of the sheath will change as it becomes abraded. Full protection of the underlying hose may continue to be provided long after the sacrificial fibres have been destroyed. Thus, periodic inspection will reveal that abrasion has occurred and will alert someone to take suitable action, either to prevent a further abrasion or to replace the now partly worn sheath.

Various other characteristics may be built into the design of the sheath depending on the nature of the hose to be protected. For example, the materials may be chosen to ensure high temperature performance, oil resistance, acid resistance, and resistance to a variety of other chemicals.

EXAMPLE

A heat-shrinkable fabric sheath was provided as follows. A narrow fabric loom was used to produce a heat-shrinkable fabric sheath of 3 cm diameter in a plain weave having lengthwise warp and circumferential weft. The weft was a cross-linked high density polyethylene monofilament of 43.4 tex and the warp fibres consisted of seven fold polyethylene terephthalate multifilaments, each of the seven filaments itself consisting of thirty four very fine filaments. Each of the seven multifilaments had a tex value of 16.7. The warp density was 38 ends per cm and the weft density was 13 picks per cm.

A section of sheath of length 25 cm was cut by means of a hot knife causing the polyethylene terephthalate warp fibres to weld together to prevent fraying. The sheath was slid over a rubber hose of 1 cm diameter and was then shrunk in place. The hose was pre-shaped and the sheath shrunk to follow the contours of the shaped hose without wrinkling.

An abrasion test was carried out using a modified form of scrape test BS5173 using both a flat blade and a pointed blade. The flat blade was weighted with 500 g and the pointed blade weighted with 200 g. The tests were carried out at 100° C. In each case no damage whatsoever had occurred after 4000 cycles.

RK571 ABRASION PROTECTION

The fabric of these sheaths comprises filaments extending substantially circumferentially around the sheath (hereinafter "hoop filaments"), at least some of which hoop filaments are heat-shrinkable, and filaments extending substantially along the sheath (hereinafter "length filaments"), and it is mentioned that some degree of longitudinal shrinkage, to avoid the problem of wrinkling of the sheath at bends in the conduits, may be provided by incorporating heat-shrinkable fibres extending in the longitudinal direction.

The present invention ingeniously addresses this wrinkling problem by providing a circumferentially-heat-shrinkable sheath of woven fabric, capable of use on a conduit, for example to provide abrasion resistance as described and claimed in co-pending British Patent Application No. 9612667.7 (RK556), wherein the sheath provides a substantially unobscured outer fabric surface and comprises hoop filaments extending substantially circumferentially around the sheath, at least some of which hoop filaments are heat-shrinkable, and length filaments extending substantially along the sheath, which length filaments are preferably dimensionally substantially heat-stable, and wherein the length filaments are selected either (A) to be sufficiently flexible, at least at temperatures to which they are subjected during heat-shrinking of the sheath in use, for the heat shrinkage of the hoop filaments to crimp the length filaments to an extent (a) producing at least 1%, preferably at least 2%, more preferably at least 5%, longitudinal shrinkage of the sheath in addition to any longitudinal heat shrinkage thereof and/or (b) causing portions of the length filaments to project outwardly from the shrunken fabric sheath to a maximum distance greater than the maximum projection distance of the thus-shrunken hoop filaments or (B) to be sufficiently stiff to limit the longitudinal shrinkage due to crimping of the length filaments to less than 10%, preferably less than 5%, more preferably less than 2%, especially less than 1% or substantially zero.

The (preferred) longitudinal shrinkage of the sheaths due to crimping of the length filaments by the heat-shrinking hoop filaments (hereinafter "crimp shrinkage" for brevity) and/or the greater projection of the length filaments after heat-shrinkage of the sheath (hereinafetr "crimp hiding" of the hoop filaments) may be achieved or enhanced by holding the length filaments under tension during weaving of the fabric, so as to resist (to a desired extent) crimping by the relatively low weaving tension of the hoop filaments. In tubular weaving processes, the hoop filament tension is maintained as low as practicable to avoid undesired constriction of the tubular sheath as it is progressively formed. If the length filaments are already crimped in the fabric as woven, the heat-shrinking of the hoop filaments may nevertheless tend to produce useful longitudinal crimp shrinkage and/or crimp hiding owing to the accompanying increase in hoop filament thickness which increases the depth of the initial crimp in the length filaments.

The alternative of using relatively stiff length filaments to limit the crimp shrinkage may be useful to enable selection of a uniquely controllable degree of crimp shrinkage, using the stiffer length filaments alone or together with more flexible length filaments. Controlled crimp shrinkage may be especially useful in applications where the final length of the sheath is required to match a specific length of conduit on which it is used. Suitable stiffer length filaments may be selected by simple trial and error, for example from plastics monofilaments or possibly glass filaments.

It is preferred to construct the fabric sheath so that it will have longitudinal crimp shrinkage within the range from 10 to 20% on unrestricted circumferential heat-shrinkage (that is shrinkage to its fullest extent without any conduit or other substrate inside the sheath). In use, the crimp shrinkage will normally be less than the unrestricted maximum, due to the presence of such a conduit or substrate, which will halt the circumferential shrinkage, and thus also the crimp shrinkage, at an intermediate stage as the sheath tightens around it. Preferably there will be negligible longitudinal heat-shrinkage, for example less than 5%, preferably less than 2%, more preferably not more than 1%.

It is observed that the parameters responsible for producing the crimp shrinkage are dominated by the flexibility of the length filaments, which will preferably be evident at ambient temperatures, but may be provided by length filaments which are relatively stiff and inflexible at ambient temperatures, but become adequately more flexible at temperatures to which they are subjected during the heat-shrinking of the sheath in use. Other fabric parameters, such as weave design, number of weft insertions, or number of warp ends, tend to have relatively little effect on the crimp shrinkage of the length filaments and/or crimp hiding of the hoop filaments. For example, a weave design in which the length filaments pass over three hoop filaments (so-called "3-in-1") may produce less initial crimp in the length filaments than would occur in a plain "1-in-1" weave. Fewer weft insertions per unit length and/or fewer warp ends per unit length may tend to increase the longitudinal crimp shrinkage, while too many of either may produce a fabric in which the desired heat-shrinkage is hindered by undesirably tight weaving. Thus, a balance may be struck to some extent by simple trial and error between the looseness or tightness of the weave and the degree of additional crimp shrinkage desired. However, these factors are minor compared with the effect of the length filament flexibility on the degree of crimp shrinkage and/or crimp hiding achieved in practice.

The tension and flexibility of the length filaments will preferably be sufficient to cause them to project outwardly from the fabric to a lesser extent than the hoop filaments, which hoop filaments will therefore tend to undulate over and under the relatively straighter length filaments. The length filaments will preferably be woven to project outwardly from the fabric to a maximum distance less than 85%, preferably less than 70%, more preferably less than 55%, of the maximum projection of the hoop filaments.

The heat-shrinkage forces of the hoop filaments will preferably be sufficient to crimp the length filaments to an extent which causes them to project outwardly from the shrunken fabric sheath to a maximum distance greater than, preferably at least 25% greater than, more preferably at least 50% greater than, especially at least 75% greater than, the maximum projection distance of the shrunken hoop filaments. It is advantageous for the flexibility of the length filaments and the shrinkage forces of the hoop filaments to be sufficient to cause the crimped length filaments subsatntially to conceal the shrunken hoop filaments after the heat-shrinking step. This "hiding" or "burying" of the hoop filaments on heat-shrinking of the sheath enables the length filaments to be selected for their abrasion-resisting properties; and the hoop filaments to be selected for optimum heat-shrink properties without too much regard to abrasion resistance, which may not always be easy to combine with preferred levels of heat-shrink performance. As a result of the more abrasion-resistant length filaments thus being predominantly exposed on the surface of the sheath after shrinking, the abrasion resistance may be effectively increased relative to that of the unshrunk sheath, in addition to the desirably close fit around the conduit achieved by the heat-shrinking operation.

The projection distances may be understood as being measured to the outermost surface of the hoop or length filaments, whichever is on top as they pass over and under each other. In a plain weave, the hoop and length filaments pass alternately over and under each other, so that the projection distance of a hoop filament where it passes over one of the length filaments may be compared with the projection distance of that same length filament where it passes over the immediately adjacent hoop filament. The projection distances may be measured from any convenient fixed point, for example a plane lying parallel with the fabric and contacting the innermost points of the inner fabric surface, or a similar plane passing through the mid-point of the fabric thickness. It may be preferable in practice to measure the average incremental projection distance of whichever filaments (hoop or length) project further outwards, measured from the outermost surface of the adjacent less-outwardly-projecting other filaments (length or hoop) at their point of maximum projection.

It will be understood that the reference to circumferentially-heat-shrinkable sheaths does not necessarily limit the invention to tubular sheaths of substantially circular cross-section. Sheaths of square, triangular, hexagonal, or any other desired tubular cross-section, whether woven as tubes or formed by wrapping around and fastening a fabric originally woven as a sheet, may be included, provided that they are heat-shrinkable in the direction of the perimeter so as to narrow the tube, thus enabling them to contract around and grip the conduits to which they provide abrasion resistance in use. The requirement that the sheath provides a substantially unobscured outer fabric surface will be understood as excluding sealed heat-shrinkable fabrics whose external surface is covered with a layer of polymeric material of at least 0.03 mm thickness, as described for example in EP-A-0117026 (RK176), but may include fabrics with coatings from which at least parts of the filaments project to provide an abrasion-resisting contact function in use.

The hoop filaments in this aspect of the present invention extend substantially circumferentially around the sheath, as distinct from the helical filaments of a braid, which extend very noticeably along the sheath as well as around it. The length filaments of the fabric according to the present invention extends substantially along the sheath, preferably substantially parallel with the sheath tubular axis, although a certain amount of helical curvature of these length filaments may be tolerable in practice and is to be understood as included within the expression "substantially along the sheath". It is generally preferred, though not essential, that the hoop filaments are provided by the weft of the fabric and the length filaments are provided by the warp of the fabric.

The invention also includes a method of making the sheaths hereinbefore described by weaving with the length (preferably warp) filaments held under sufficiently high tension and the hoop (preferably weft) filaments under sufficiently low tension to produce the aforesaid crimp shrinkage effect.

The length filaments are preferably multi-filament yarns, especially substantially-untwisted tows, for enhanced abrasion resistance, as mentioned in the aforesaid co-pending application. Multi-filament yarns tend to spread out to enhance their surface coverage, while their degree of surface projection from the sheath may be only a few multi-filaments deep, thus advantageously reducing the degree of strain imposed on the filament material at outside bend radii. The spreading and flexibility of multi-filaments yarns may also produce advantageous softness and noise-deadening impact insulation effects to reduce rattling in vehicles and other end uses. Mono-filaments or tape-like length filaments could nevertheless be used, provided they are flexible enough to provide a useful degree of crimp shrinkage and/or crimp hiding. The exact degree of flexibility is not readily quantifiable, but will generally be greater than that of relatively brittle materials such as glass fibre and can readily be tested by trial and error in practice. Lower flexibility may to some extent be better tolerated as the diameter of the filaments decreases.

It is an advantage of the crimp shrinkage feature of the present invention that reduction or prevention of sheath wrinkling at bends in the conduit to be protected can be achieved with little (e.g. less than 5%, preferably less than 2%, more preferably less than 1%, or substantially no, longitudinal heat shrinkability of the fabric sheath.

The fabric of the sheath may usefully be woven so as to provide the sheath before shrinking with a degree of longitudinal stretch, preferably less than 10%, more preferably within the range from 0.5% to 5%, especially 1% to 3%. Such longitudinal stretch may enable the sheath better to accomodate stretching around the outside of bends in the conduit onto which it is fitted in use, thus facilitating initial positioning on the conduit and co-operating with the wrinkle-removing effect of the crimp shrinkage on the inside of the bends to enhance the appearance of the final shrunken sheath thereon. Such longitudinal stretch may be influenced by the length filament structure, softer multi-filament yarns for example tending to give greater stretch, and by the weave design, the aforementioned looser "3-in-1" weaves for example tending to allow greater stretching than tighter plain weaves.

Specific embodiments of the invention will now be described by way of example with reference to the accompanying schematic drawings, wherein.

Figure 1:
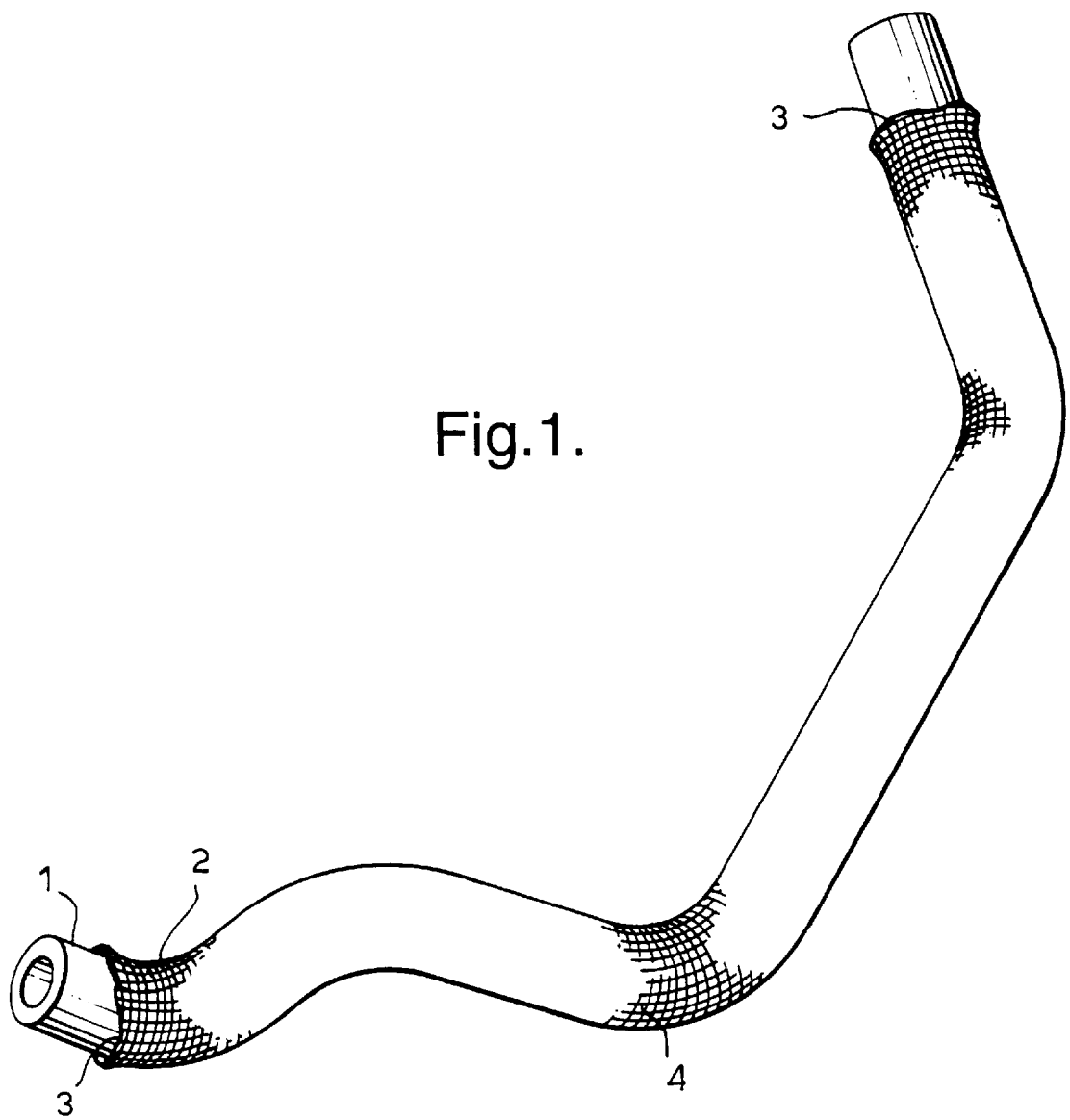
FIG. 1 shows a shaped rubber automotive hose protected by a surround heat-shrunk fabric sheath.

Referring to the drawings, in FIG. 1 the hose is designated 1, the sheath 2, and the cut and sealed ends of the sheath 3. Circumferential ribs 4 can be seen along the length of the sheath.

Figure 2:
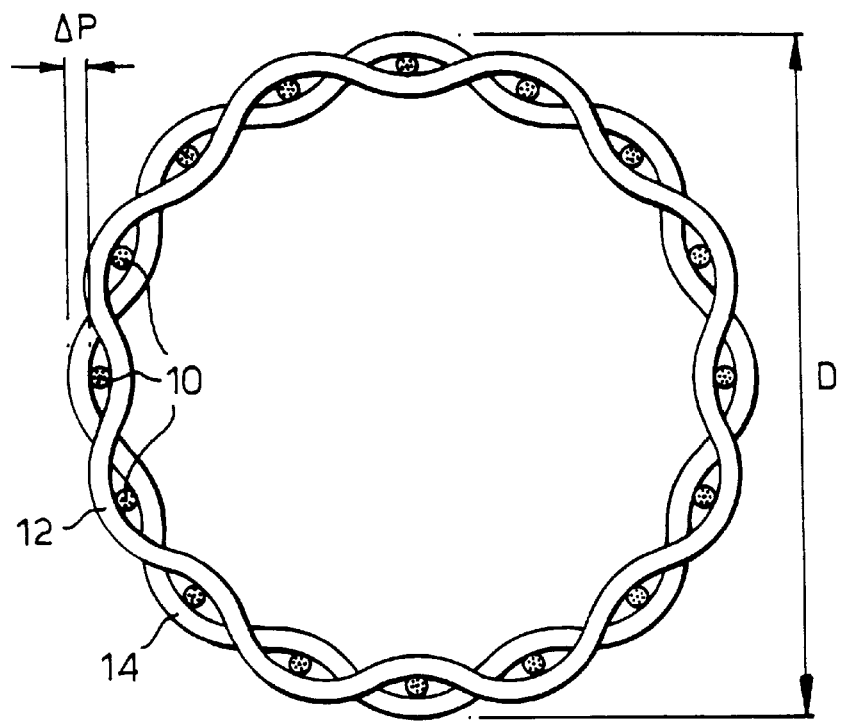
FIG. 2 illustrates an idealised end view of a tubular fabric sheath according to the invention having heat-shrinkable hoop filaments and straight length filaments.
Figure 3:
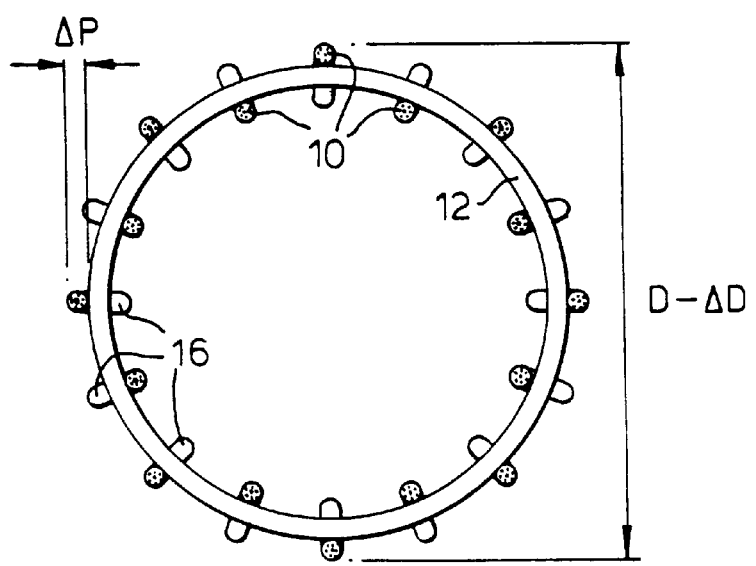
FIG. 3 shows the sheath of FIG. 2 after heat shrinking of the hoop filaments.

FIG. 2 shows a sheath having notionally straight length filaments 10 formed by the warp of a plain weave under suitably high weaving tension, and shows two of the heat-shrinkable hoop filaments 12, 14 adjacent to each other formed by the weft, giving the substantially circular sheath an outer diameter D. At this stage, it can be seen that the hoop filaments 12, 14 project further outwards than the length filaments 10 by a distance $\Delta P$, which is approximately equal to the thickness of the hoop filaments in this idealised construction having straight length filaments. FIG. 3 shows the sheath of FIG. 2 after the hoop filaments 12, 14 have been heat shrunk, thus reducing the sheath diameter by an amount ΔD. The ends of the multi-filament length filaments 10 which were visible between the hoop filaments 12, 14 in FIG. 2 are now on opposite sides of the single visible hoop filament 12, the other hoop filament 14 now being obscured behind the visible filament 12 owing to both hoop filaments now being notionally straightened by their heat recovery forces, thus crimping the length filaments 10 so that further portions 16 of the length filaments 10 are now visible where they pass over the obscured rear hoop filament 14.

Figure 4:
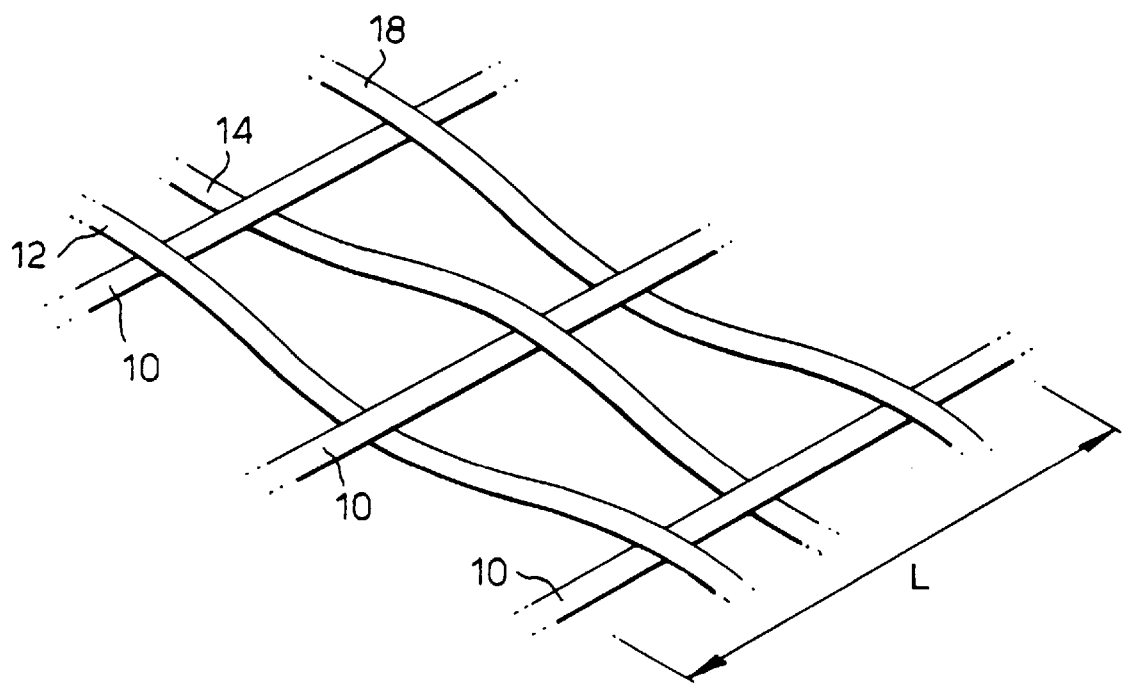
FIGS. 4 and 5 show in idealised perspective a small section of the sheath fabric before and after heat shrinking.
Figure 5:
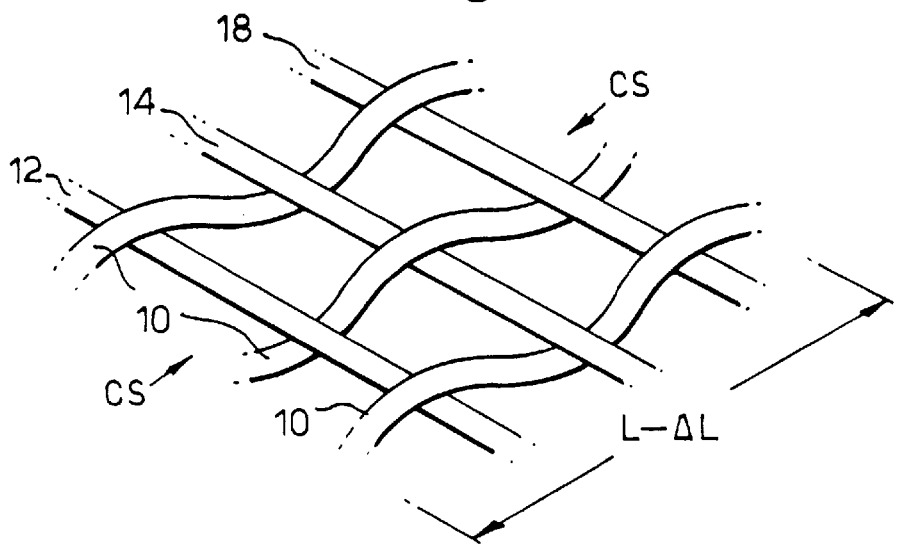

FIGS. 4 and 5 illustrate in idealised perspective the lengthwise crimp shrinkage of the length filaments 10 resulting from the circumferential heat shrinkage of the hoop filaments 12, 14, 18. The straightening of the undulating hoop filaments 12, 14, 18 of FIG. 4 induces crimping of the originally straight length filaments 10 as shown in FIG. 5, thus reducing the length L of the sheath fabric by an amount ΔL.

Figure 6A:
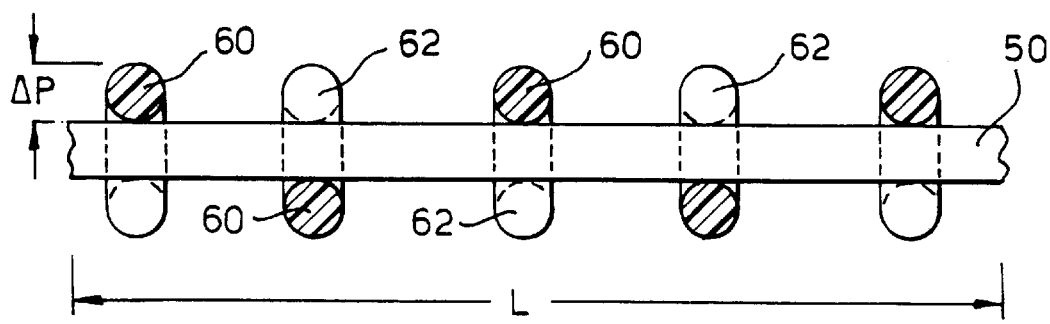
FIG. 6A shows an idealised edge view of the fabric of FIG. 2, showing one straight length filament and looking along the hoop filaments.
Figure 6B:
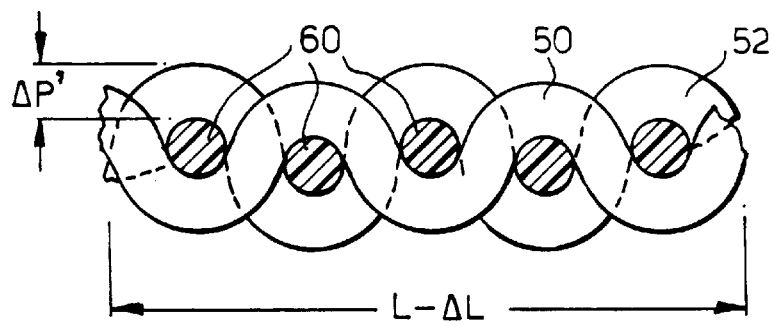
FIG. 6B shows the fabric of FIG. 6A after heat shrinking.
Figure 6C:
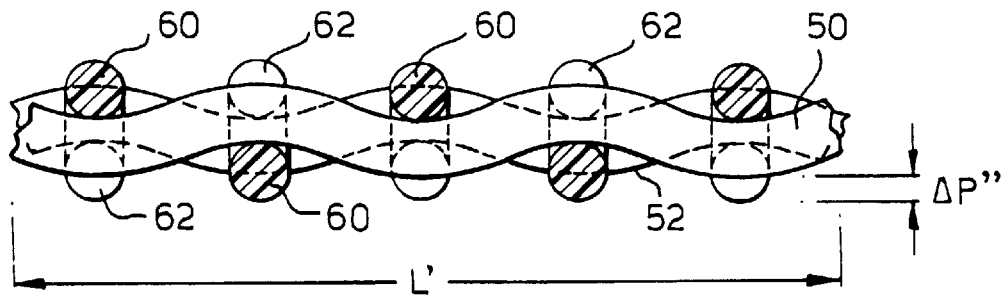
FIG. 6C shows a less-idealised version of FIG. 6A, in which the length filament is not perfectly straight.

FIGS. 6A to 6C illustrate the crimp shrinkage in another view, looking sideways at a length filament 50 of length L, behind which can be seen (in FIGS. 6B and 6C) another length filament 52. The hoop filaments 60 can be seen above and below the notionally straight length filament 50 in FIG. 6A, with further portions 62 of the hoop filaments visible where they pass over the concealed length filament 52. The hoop filaments project outwards further than the length filaments by a distance ΔP, roughly equal to the hoop filament thickness as before. After heat shrinking of the hoop filaments 60, the length filaments 50, 52 are crimped, reducing the sheath length by an amount ΔL as shown in FIG. 6B, as the hoop filaments 60 pull themselves inwards and become relatively straighter. The length filaments 50, 52 now project outwardly by a greater distance ΔP' than the hoop filaments 60. In reality, the length filaments 50, 52 are unlikely to be woven perfectly straight in the unshrunken fabric sheath, and may tend to undulate somewhat over and under the hoop filaments 60 (and their nether portions 62), as shown in FIG. 6C. In that case, the incremental projection ΔP" of the unshrunk hoop filaments will be less than that shown as ΔP in FIG. 6A. Also, the unshrunken sheath length L' will be less than the notional length L of FIG. 6A, so that the lengthwise crimp shrinkage may be proportionally smaller when the hoop filaments are heat shrunk.

What is claimed is:

1. A circumferentially-heat-shrinkable sheath of woven fabric, capable of use on a non-linear shaped conduit to provide impact cushioning and/or abrasion resistance, wherein the sheath provides a substantially unobscured outer fabric surface and comprises:

hoop filaments extending substantially circumferentially around the sheath, at least some of which hoop filaments are heat-shrinkable, and length filaments extending substantially along the sheath, and wherein the length filaments are selected to be sufficiently flexible, at least at temperatures to which they are subjected during heat-shrinking of the sheath in use, for the heat shrinkage of the hoop filaments to crimp the length filaments to an extent of at least one of the following:

(a) producing at least 1% longitudinal shrinkage of the sheath in addition to any longitudinal heat shrinkage thereof; and (b) causing portions of the length filaments:

(i) to project outwardly from the shrunk fabric sheath to a maximum distance in excess of the maximum projection distance of the thus-shrunken hoop filaments, or (ii) to increase such excess projection distance if already existing before the heat shrinkage.

2. The sheath according to claim 1, in which the fabric comprises a weave having flexible fibres running substantially parallel to the length of the sheath, the fibres running substantially circumferentially of the sheath.

3. The sheath according to claim 1, in which the fabric after shrinkage has an optical coverage of at least 75%.

4. The sheath according to claim 1, in which the sheath has a circumferential shrinkage ratio of from 1.5:1 to 4:1.

5. The sheath according to claim 1, in which the sheath has a longitudinal shrinkage ration of from 1 to 20%.

6. The sheath according to claim 1, in which the fabric has a crimp that is predominantly in the longitudinal direction of the sheath.

7. The sheath according to claim 1, in which the fabric is ribbed, having its ribs running substantially circumferentially of the sheath.

8. The sheath according to 1, in which the fabric is a weave having its warp in the longitudinal direction of the sheath.

9. The sheath according to claim 1, in which the longitudinal fibres comprise multi-filament bundles.

10. The sheath according to claim 1, in which the circumferential fibres comprise monofilaments.

11. The sheath according to claim 1, in which the fabric comprises a weave having 25–60 warp ends per cm.

12. The sheath according to claim 1, in which the fabric comprises a weave having from 3–20 weft picks per cm.

13. The sheath according to claim 1, in which fibres which predominate on an external surface of the sheath comprise one of a polyester and a nylon.

14. The sheath according to claim 1, in which the sheath is heat-shrinkable by virtue of heath-shrinkable polyethylene fibres thereof.

15. The sheath according to claim 1, in which the sheath is cut-to-length by means of a hot blade.

16. A sheath according to claim 1, wherein the heat-shrinkage forces of the hoop filaments and the flexibility of the length filaments are sufficient to crimp the length filaments to an extent which causes them to project outwardly from the fully shrunken fabric sheath to a maximum distance at least 25% greater than the maximum projection distance of the fully heat-shrunken hoop filaments.

17. A sheath according to claim 1, wherein portions of the hoop filaments are clearly visible from the exterior of the sheath before heat shrinking and the length filaments substantially conceal the hoop filaments from exterior view in the fully heat-shrunken sheath.

18. A sheath according to claim 1, which before shrinking has a degree of longitudinal stretch less than 10%.

19. A method of providing abrasion resistance to a non-linear shaped conduit comprising utilizing the sheath of claim 1, wherein the sheath when circumferentially heat shrunk also undergoes some longitudinal shrinkage.

20. A sheath according to claim 1, wherein the length filaments are dimensionally substantially heat-stable at temperatures encountered during the heat-shrinkage of the sheath.

21. A sheath according to claim 1, wherein the hoop filaments are provided by the weft of the fabric and the length filaments are provided by the warp of the fabric.

22. A sheath according to claim 1, wherein the sheath has been rendered more susceptible to the said longitudinal shrinkage (crimp shrinkage) by holding the length filaments under higher-than normal tension so as to resist crimping of the length filaments during weaving of the fabric, the hoop filaments being held at relatively lower weaving tension during weaving.

23. A sheath according to claim 22, wherein the tension of the length filaments is sufficient to cause them to project outwardly from the fabric to a lesser extent than the hoop filaments.

24. A sheath according to claim 23, wherein the length filaments are woven to project outwardly from the fabric to a maximum distance less than 85% of the maximum projection of the hoop filaments.

* * * * *